United States Patent
Kim et al.

(10) Patent No.: US 8,982,795 B2
(45) Date of Patent: Mar. 17, 2015

(54) NODE AND METHOD FOR TRANSMITTING PACKETS THEREFROM

(71) Applicant: Foundation of Soongsil University-Industry Cooperation, Seoul (KR)

(72) Inventors: Young-Han Kim, Seoul (KR); Ngoc-Thanth Dinh, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 163 days.

(21) Appl. No.: 13/711,267

(22) Filed: Dec. 11, 2012

(65) Prior Publication Data

US 2014/0153386 A1    Jun. 5, 2014

(30) Foreign Application Priority Data

Dec. 3, 2012    (KR) .................. 10-2012-0138832

(51) Int. Cl.
*H04W 4/00*    (2009.01)
*H04W 84/18*    (2009.01)
*H04W 24/04*    (2009.01)

(52) U.S. Cl.
CPC ............. *H04W 84/18* (2013.01); *H04W 24/04* (2013.01); *Y02B 60/50* (2013.01)
USPC ........................................ 370/328

(58) Field of Classification Search
CPC .............................. H04W 24/04; H04W 84/18
USPC ......................................... 370/328, 329, 341
See application file for complete search history.

(56) References Cited

U.S. PATENT DOCUMENTS

| | | | |
|---|---|---|---|
| 2005/0220057 A1* | 10/2005 | Monsen | 370/334 |
| 2010/0008311 A1* | 1/2010 | Oh et al. | 370/329 |
| 2011/0145578 A1* | 6/2011 | Asano et al. | 713/169 |
| 2012/0059903 A1* | 3/2012 | Kim | 709/217 |
| 2014/0010069 A1* | 1/2014 | Abbasi et al. | 370/221 |

\* cited by examiner

*Primary Examiner* — Chuong T Ho
(74) *Attorney, Agent, or Firm* — Mintz Levin Cohn Ferris Glovsky and Popeo, P.C.; Kongsik Kim; Jonathon P. Western

(57) ABSTRACT

Disclosed are a node and a method of transmitting packets from the node. The disclosed node may use a directional antenna for transmitting a packet. The node includes a determining unit and a forwarding unit. The determining unit may determine whether or not there is an actor node present in a region traversed by a packet forwarding direction, where the packet forwarding direction is determined from relative-location information of a destination node with respect to a source node, the region is one of a plurality of regions divided by particular angles, and the plurality of regions have multiple beam patterns of the node formed therein. The forwarding unit may transmit the packet to an actor node present in the region traversed by the packet forwarding direction or transmit the packet to a neighbor node present in the region traversed by the packet forwarding direction.

14 Claims, 14 Drawing Sheets

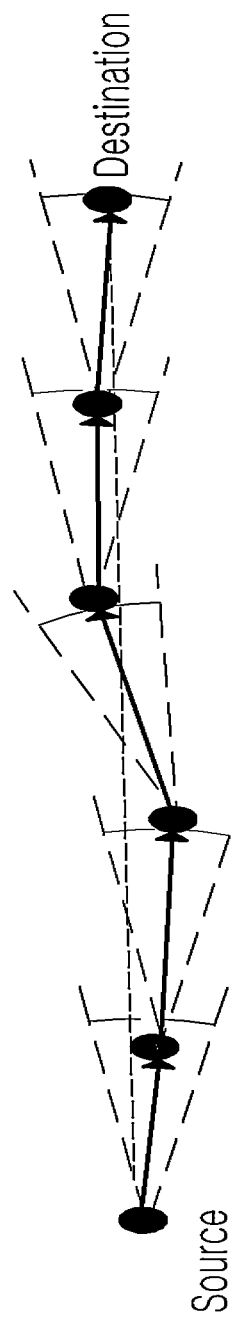

NODE AND METHOD FOR TRANSMITTING PACKETS THEREFROM

CROSS-REFERENCE TO RELATED APPLICATIONS

This application claims the benefit of Korean Patent Application No. 10-2012-0138832, filed with the Korean Intellectual Property Office on Dec. 3, 2012, the disclosure of which is incorporated herein by reference in its entirety.

BACKGROUND

1. Technical Field

The present invention relates to a node and a method of transmitting packets from the node. More particularly, the invention relates to a node for transmitting packets using a directional antenna that utilizes actors to select efficient directional anycast routing paths, and to a method of transmitting packets from the node.

2. Description of the Related Art

Wireless sensor and actor networks (WSANs) are composed of various devices referred to as sensor nodes, actor nodes, and sink nodes.

The sensor node may be a low-cost power constrained-resource device capable of communicating in short distances, and the actor node may typically be a resource-rich device with a higher processing capability, higher transmission capability, and longer battery life or renewable energy.

The actor node may collect and process data and perform actions on the environment based on the information gathered. The sensor nodes, actor nodes, and sink nodes may need to coordinate and collaborate to execute their tasks.

A critical routing issue in WSANs is to minimize delay and energy consumption. Although recent researches are specifically investigated in coordination and communication problems in the WSAN, the literature on this topic is still limited.

In a WSAN, there may be four main kinds of traffic, including sensor-sink, sensor-sensor, sensor-actor, actor-actor communication. The first two communication patterns are familiar in the field of wireless sensor networks and the others have arisen from a new entity of actor putting on the wireless sensor network.

The current approaches for the WSAN may reuse the protocols for sensor-sensor and sensor-sink from sensor networks and then propose new protocols for sensor-actor and actor-actor communication.

However, such approaches separate different protocols for different traffic patterns. In particular, sensor-actor coordination may be based on event-driven paradigm, and actor-actor coordination may be based on distributed solution in a theory framework.

Although these protocols might run well in some cases, the overall performance of the WSAN may not be so good, because these may cause the network to be complex and desultory, which is not suitable for constrained sensor node devices.

Therefore, an investigation is needed of a unified protocol of a unified framework for arbitrary traffic in the WSAN.

SUMMARY

To resolve the problems in the related art stated above, an aspect of the invention proposes a node for transmitting packets using a directional antenna capable of selecting efficient directional anycast routing paths, as well as a method of transmitting packets from the node.

An embodiment of the invention provides a node for transmitting a packet using a directional antenna. The node includes a determining unit and a forwarding unit. The determining unit may determine whether or not there is an actor node present in a region traversed by a packet forwarding direction, where the packet forwarding direction is determined from relative-location information of a destination node with respect to a source node, the region is one of a plurality of regions divided by particular angles, and the plurality of regions have multiple beam patterns of the node formed therein. The forwarding unit may transmit the packet to an actor node present in the region traversed by the packet forwarding direction or transmit the packet to a neighbor node present in the region traversed by the packet forwarding direction.

The forwarding unit can transmit the packet to the actor node if it is determined that there is an actor node present, and can transmit the packet to the neighbor node if it is determined that there is no actor node present.

The actor node can be an actor node nearest to the node in the region traversed by the packet forwarding direction, from among one or more actor nodes each configured to receive a location information request message transmitted from the node to each of the plurality of regions, calculate its relative position with respect to the node, and transmit a reply message including the calculated relative-location information to the node.

The distance from the node to the nearest actor node can be shorter than the distance from the node to the destination node.

The neighbor node can be a first node located in a region traversed by the packet forwarding direction, from among multiple nodes each configured to receive a location information request message transmitted from the node to each of the plurality of regions, calculate its relative position with respect to the node, and transmit a reply message including the calculated relative-location information to the node.

The first node can be a node located closest to the packet forwarding direction from among the multiple nodes.

If the first node is in a state incapable of transmitting the reply message, the neighbor node can be a second node located closest to the packet forwarding direction from among the multiple nodes other than the first node.

If there is no neighbor node present in the region traversed by the packet forwarding direction, the forwarding unit can transmit a directional failure message to multiple nodes located in regions other than the region traversed by the packet forwarding direction from among the plurality of regions.

The forwarding unit can transmit the packet using a k-th beam pattern, from among the plurality of beam patterns of the node formed in the region traversed by the packet forwarding direction, and if a directional failure message including information regarding a packet forwarding failure region is received from the neighbor node, the forwarding unit can transmit the packet using a (k+1)-th beam pattern adjacent to the k-th beam pattern.

The region traversed by the packet forwarding direction can be a region in which are formed an n-th beam pattern (wherein n is an integer greater than or equal to 2) as well as an (n+1)-th beam pattern and an (n−1)-th beam pattern adjacent to the n-th beam pattern, from among the multiple beam patterns of the node.

The packet forwarding direction can be a vector connecting the source node with the destination node determined from the relative-location information of the destination node with respect to the source node.

Another embodiment of the invention provides a method of transmitting a packet from a node using a directional antenna. The method includes determining whether or not there is an actor node present in a region traversed by a packet forwarding direction, where the packet forwarding direction is determined from relative-location information of a destination node with respect to a source node, the region is one of a plurality of regions divided by particular angles, and the plurality of regions have multiple beam patterns of the node formed therein; and transmitting the packet to an actor node present in the region traversed by the packet forwarding direction or to a neighbor node present in the region traversed by the packet forwarding direction.

Certain embodiments of the invention utilize actors to select efficient directional anycast routing paths.

Certain embodiments of the invention can also reduce energy consumption of the sensors to improve network life span and can reduce end-to-end packet delivery delay.

Additional aspects and advantages of the present invention will be set forth in part in the description which follows, and in part will be obvious from the description, or may be learned by practice of the invention.

BRIEF DESCRIPTION OF THE DRAWINGS

FIG. 1A and FIG. 1B are diagrams illustrating the operation of a network based on an actor-oriented directional anycast routing method according to an embodiment of the invention.

DETAILED DESCRIPTION

Figure 1A:
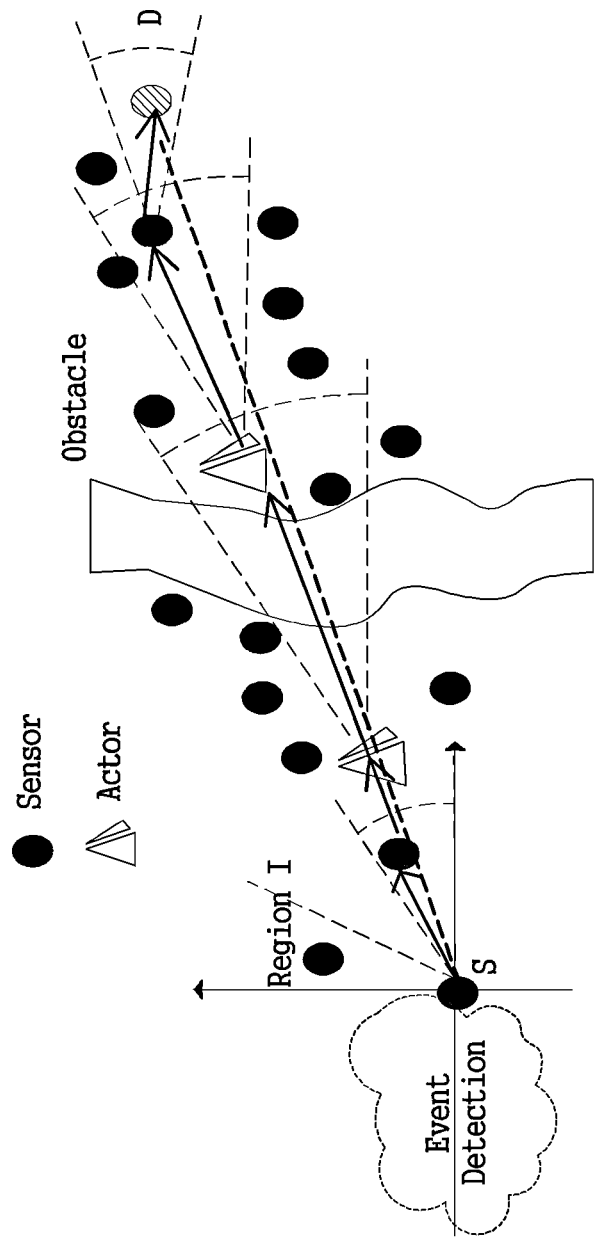

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the written description, certain detailed explanations of related art are omitted when it is deemed that they may unnecessarily obscure the essence of the present invention. In describing the drawings, similar reference numerals are used for similar elements.

Certain embodiments of the present invention will be described below in more detail with reference to the accompanying drawings.

FIGS. 1A and 1B are diagrams illustrating the operation of a network based on an actor-oriented directional anycast (ADA) routing method according to an embodiment of the invention.

As illustrated in FIGS. 1A and 1B, a network can include a source node (S), a destination node (D), a plurality of wireless sensor nodes, and a plurality of actor nodes; and the actor-oriented directional anycast routing method enables the selection of efficient routing paths for arbitrary traffic in wireless sensor and actor networks.

A routing method according to an embodiment of the invention utilizes directional antennas and rich-resource actors to save sensor energy and support arbitrary traffic.

That is, each node uses directional antennas to communicate with other nodes. By using direction antennas, the relative location of a node can be easily obtained without requiring a positioning module such as a GPS in every entity.

Figure 2:
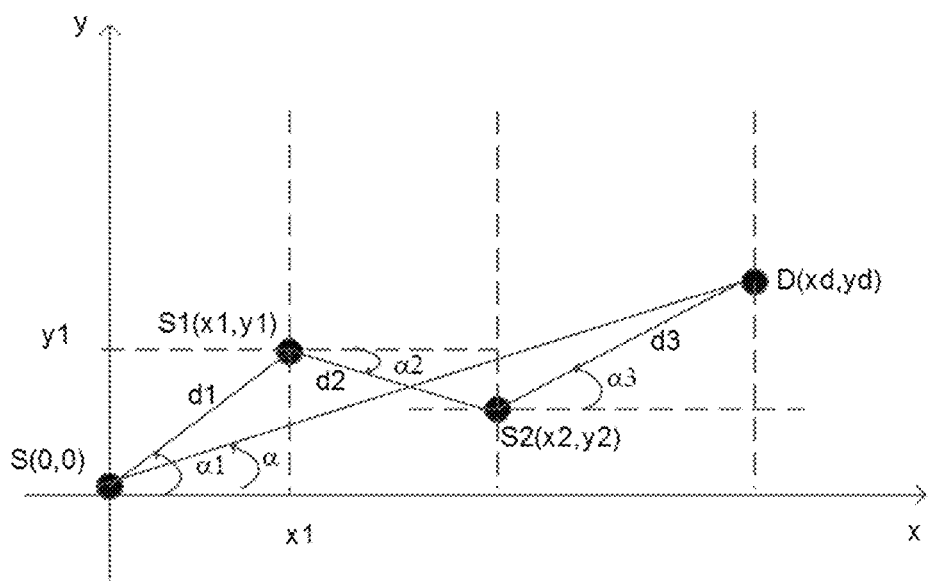
FIG. 2 is a diagram illustrating a method of calculating a relative location using a directional antenna according to an embodiment of the invention.

FIG. 2 illustrates a method of calculating a relative location using directional antennas. As illustrated in FIG. 2, the relative location can be accurately obtained based on distance and transmission angle.

The relative location of a node thus obtained may be used to determine the forwarding direction of a packet.

It can be preferable for each node to have 360°/θ beams to cover the whole direction, where θ may represent the beam width.

Because of sparse topology of actors, the probability of an actor existing in each beam may be small. Therefore, according to an embodiment of the invention, the whole direction of a node may be divided into a plurality of regions, in order to exploit the capacity of rich-resource actors.

Here, one or several beams may exist in the angular space of each region within a node.

According to an embodiment of the invention, the nearest actor, i.e. the actor located closest to the node from among the actors located in each region, may be selected in each region of a node as an anchor to support forwarding packets to a destination located in this region.

To forward a packet using directional antennas, the forwarding direction can be calculated based on the relative location of the sender and destination.

From the calculated forwarding direction, a routing method according to an embodiment of the invention may determine which nearest actor in the corresponding region should be used to relay the packet to the destination.

If the nearest actor does not exist, the packet may be forwarded directionally to the next hop closest to the forwarding direction.

The actor-oriented directional anycast (ADA) routing method according to an embodiment of the invention can thus utilize actors to select efficient directional anycast routing paths.

Furthermore, embodiments of the invention can improve the network life span in a wireless sensor and actor network, reduce packet delivery delay, and increase packet delivery rate.

The actor-oriented directional anycast routing method according to an embodiment of the invention will be described below in further detail with reference to FIGS. 2 to 9, from the perspective of a sensor node 100 forming a part of the network.

Figure 3:
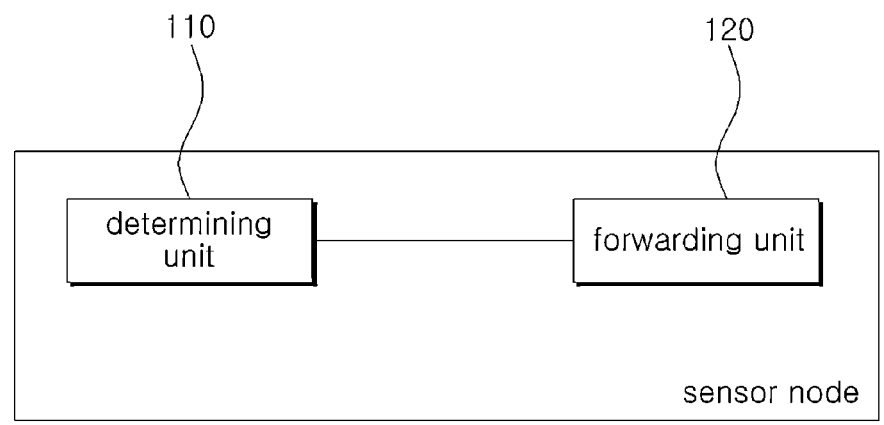
FIG. 3 is a diagram illustrating the composition of a sensor node according to an embodiment of the invention.

FIG. 3 is a diagram illustrating the composition of a sensor node 100 according to an embodiment of the invention.

Figure 4:
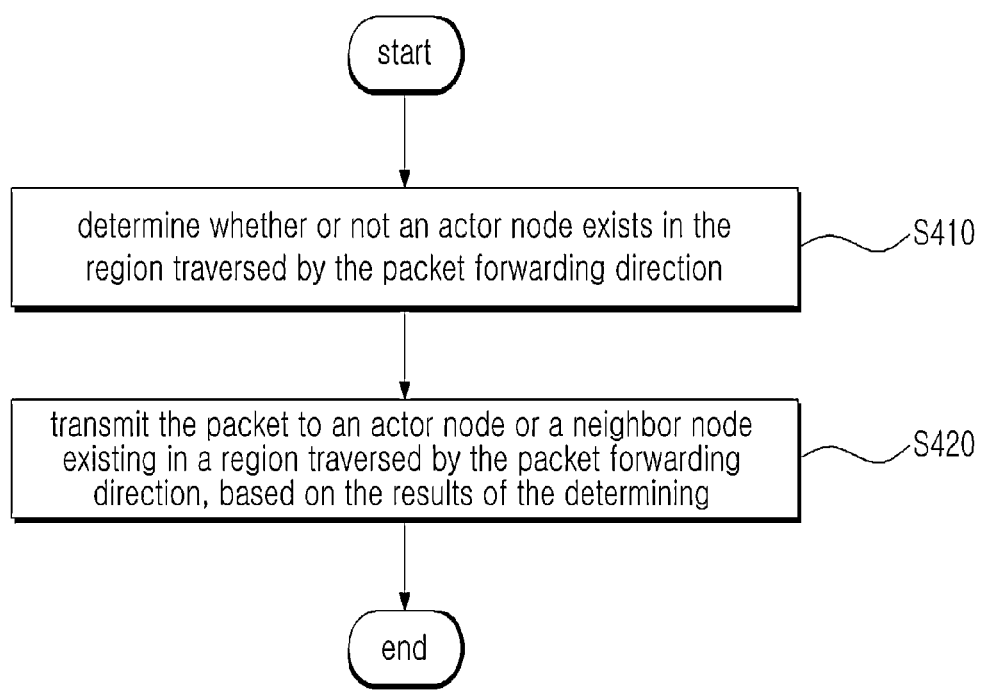
FIG. 4 is a flowchart illustrating a chronological process of a method of transmitting packets from a sensor node according to an embodiment of the invention.

FIG. 4 is a flowchart illustrating a chronological process of a method of transmitting packets from a sensor node 100 according to an embodiment of the invention.

As illustrated in FIG. 3 and FIG. 4, the sensor node 100 may include a determining unit 110 and a forwarding unit 120, while the method of transmitting packets may include determining whether or not there is an actor node present (S410) and transmitting a packet (S420).

First, in operation S410, the determining unit 110 may determine whether or not an actor node exists in a region that is traversed by the packet forwarding direction, which is determined from the relative-location information of the destination node with respect to the source node.

Here, the packet forwarding direction may be determined from the relative-location information of the destination node with respect to the source node, and can be a vector that connects the source node with the destination node.

Also, according to an embodiment of the invention, the packet forwarding direction may be determined from the relative-location information of the destination node with respect to the source node, and can be a vector that connects the node 100 with the destination node.

Also, the region can be any one of a plurality of regions, in which multiple beam patterns of the node 100 are formed and which may be divided by particular angles.

As described earlier, each node may have 360°/θ beams to cover the whole direction, where θ may represent the beam width; for example, if the beam width is 90°, there may be four regions.

That is, from among the plurality of regions in which multiple beam patterns are formed, the node 100 may determine whether or not an actor node exists in a region corresponding to a calculated packet forwarding direction, i.e. a region traversed by a vector connecting the source node with the destination node (or a vector connecting the node 100 with the destination node). As described below, the packets may be forwarded to an actor node or a neighbor node in the corresponding region based on this determination result.

Next, in operation S420, the forwarding unit 120 may transmit a packet to the actor node existing in the region traversed by the packet forwarding direction or transmit a packet to a neighbor node existing in the region traversed by the packet forwarding direction, based on the determination result of operation S410.

That is, the forwarding unit 120 may forward the packet to the actor node if the determination result of operation S410 shows that there is an actor node present, and may forward the packet to the neighbor node if the determination result shows that there is no actor node present.

Here, the forwarding unit can transmit the packet using the k-th beam pattern, from among the node's plurality of beam patterns formed in the region corresponding to the calculated packet forwarding direction, i.e. the region traversed by the packet forwarding direction. As described below, if a directional failure region exists around the node 100, the packet can be transmitted using another beam pattern, such as the (k+1)-th beam pattern or the (k−1)-th beam pattern, for example, from among the plurality of beam patterns formed in the corresponding region.

The actor node can be an actor node nearest to the node 100 in the region traversed by the packet forwarding direction, from among one or more actor nodes each of which receives a location information request message that is transmitted from the node 100 to each of the plurality of regions, calculates its relative locations with respect to the node 100, and transmits to the node 100 a reply message that includes the calculated relative-location information.

Also, the neighbor node can be a first node located in a region traversed by the packet forwarding direction from among multiple surrounding nodes, each of which receives a location information request message transmitted from the node 100 to each of the plurality of regions, calculates its relative position with respect to the node 100, and transmits to the node 100 a reply message including the calculated relative-location information.

The actor node and neighbor node may each calculate its relative location and transmit it to a node 100 according to an embodiment of the invention. Below, a more detailed description is provided of the procedure for selecting the actor node and neighbor node used for transmitting the packet, from the perspective of the overall network.

Figure 5A:
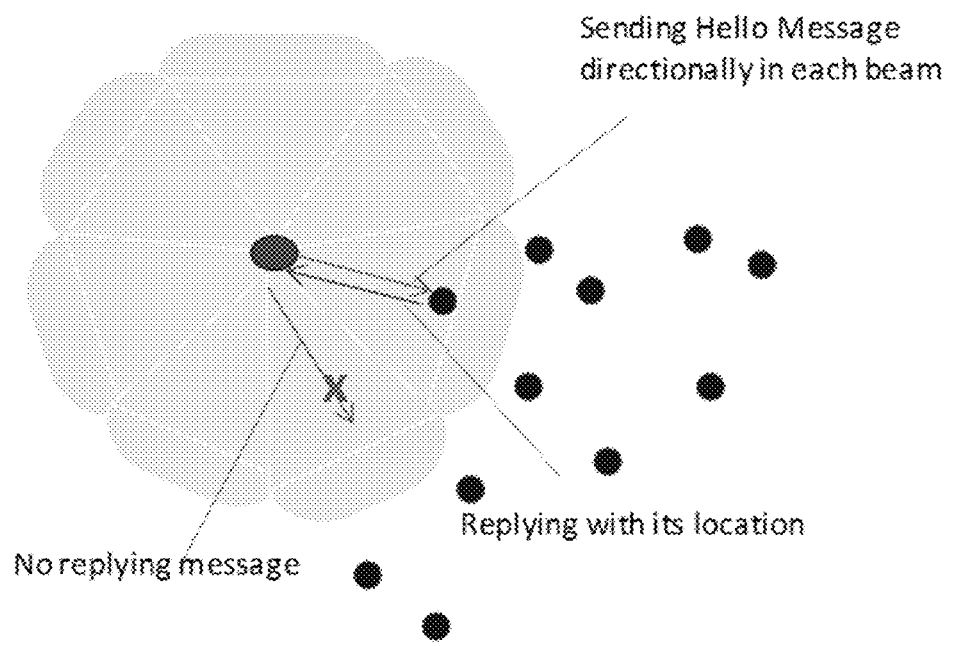
FIG. 5A is a diagram schematically illustrating a process for selecting a neighbor node to be used for forwarding packets according to an embodiment of the invention.

First, as a neighbor discovery process, each node 100 may directionally transmit its location information together with location information request messages, as illustrated in FIG. 5A, in order to discover neighbor nodes in each beam.

When a node 100 receives a reply message from its neighbors, the node 100 may localize itself by calculating its location and may send its location information to its neighbors, thus allowing the neighbor nodes to localize themselves.

However, the location request message may fail in some directions due to existing obstacles, sparse topology, or interference.

This case may be defined as a directional failure, and should this happen, a directional-failure flag (DF) may be used to mark it.

Once a directional failure occurs, the corresponding DF flag may be turned on, as described below, to notify of the need for path repair and to avoid forwarding data to the failure area.

Figure 5B:
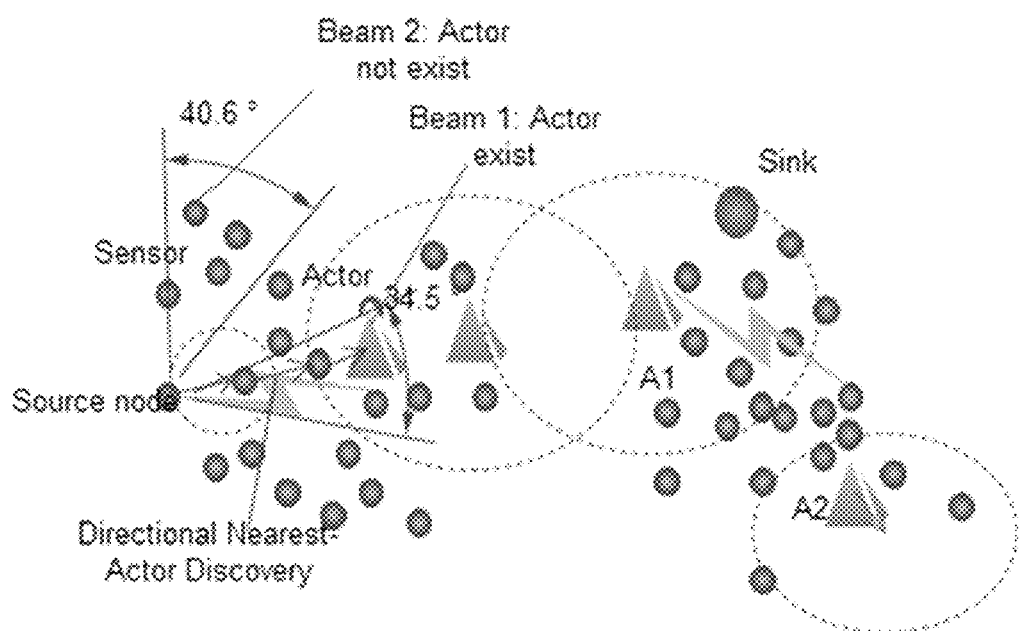
FIG. 5B is a diagram schematically illustrating a process for selecting an actor node to be used for forwarding packets according to an embodiment of the invention.

Next, as a directional nearest-actor discovery process, each node 100 may discover a directional nearest actor corresponding to each region, as illustrated in FIG. 5B, in order to exploit the capacity of rich-resource actors.

To this end, the node 100 may send a directional anycast nearest-actor discovery request to each region with its location information. The request may be forwarded directionally through intermediate nodes until it reaches a nearest actor.

During forwarding, the relative location of each intermediate node to the sender (i.e. the node 100) may be calculated based on the above localization mechanism. This information may then be attached to the packet to calculate the relative location at the next hop.

If an actor exists in this region receiving the request message, the actor may calculate its relative location with the sender based on information carried in the request message.

Then, the calculated relative-location information may be attached to the reply message and sent back to the sender.

The sender may receive the reply message and select the nearest actor based on its relative location.

According to an embodiment of the invention, the nearest-actor information can be stored for routing purposes later. If there is no reply message received by the sender after a particular duration of time (timeout), it may be determined that the nearest actor does not exist. In this case, the nearest-actor information entry may be given a null value.

Next, regarding a route discovery process, the route discovery process may be initiated by the source node if the routing information of the destination is not available.

In an actor-oriented directional anycast (ADA) routing method according to an embodiment of the invention, only the relative location of the destination to the source node is needed, rather than the full route information as other routing protocols.

In the route discovery phase, the source node may send a route request (RREQ) containing its location information in each beam using directional broadcast. The route request message may be forwarded until it reaches the destination.

Here, the relative location of the destination can be obtained using the same calculation technique used in the nearest-actor discovery phase.

After calculating the relative location, the destination may send back to the source node a route reply (RREP) message with the calculated location.

The source node may store this information in the routing table for routing purpose later.

The routing information of a route in an ADA routing method according to an embodiment of the invention may be very simple, including the destination address and its relative location, so that the size of the routing table can be reduced.

Below, a more detailed description is provided of the procedure for transmitting a packet based on an actor-oriented directional anycast routing method according to an embodiment of the invention, using the actor node and neighbor node selected as above.

When the node 100 has data to send, the node 100 may search in its route-cache for the destination's information. If the routing information for the destination is not available, a route discovery process such as that described above can be triggered.

If the relative-location information is available, the node 100 may calculate the direction from itself to the destination.

Next, a packet may be initiated containing the relative-location information of the destination, which may be used to compute the forwarding direction at intermediate nodes.

The forwarding direction may be used to determine which region and beam should be used for directional forwarding. It can be computed easily by matching the direction with the beam order.

The region and beam information of the corresponding destination can be saved in the routing table for later use.

If the nearest-actor information is found, first the node 100 may check the relative location between the nearest actor and the destination. This procedure may be employed to avoid the situation where the actor is farther from the sender than the destination.

If the nearest actor is closer than the destination, the packet may be forwarded directionally to the destination through the nearest actor based on its relative location, as shown in FIG. 1A.

Here, the route from the sender to the nearest actor can be optimized by forwarding packets to the next hop closest to the direction from the sender to the nearest actor, as illustrated in FIG. 1B.

When the nearest actor receives the packet, it may determine the direction of the destination based on the destination's location. Similarly, the beam number may also be calculated for forwarding.

If the current actor has a corresponding nearest actor in the current direction, the same forwarding operation may be repeated continuously. If not, the forwarding can also be optimized by forwarding within the maximum transmission range to a relaying node that is closest to the calculated direction. It should be noted that actors can use a long-range communication channel for forwarding.

By thus using an actor, the number of hops and intermediate sensor nodes required to relay the packet can be reduced. Also, the energy consumption of sensor nodes and end-to-end delay can also be reduced.

Using an actor for relaying packets may also help to solve sensor partition problems by using long-range transmission of actors to overcome obstacles or sparse topology areas, as shown in FIG. 1A.

If the nearest actor does not exist or the nearest actor is farther away than the destination, the packet may also be forwarded to the closest next hop in that direction, in order to save sensor energy. If there is no failure along the path, the packet may be forwarded continuously until it reaches the final destination.

During the transmission phase above, some temporary failures may occur caused by channel error, interference, or sleeping or dead nodes.

When a failure is detected, the sender (i.e. the node 100) may turn on the corresponding flag for the failed next hop in its routing table. The failed next hop may not be selected to forward any more packets, thus avoiding packet loss, until a recovered state of this node is detected.

Figure 6:
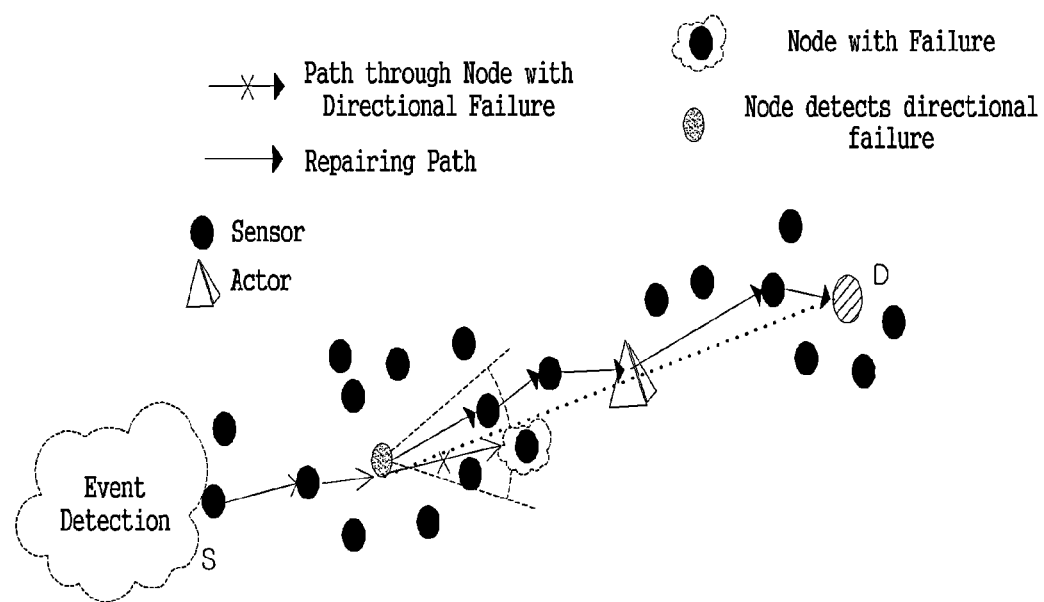
FIG. 6 is a diagram schematically illustrating a node failure repair case according to an embodiment of the invention.

The sender may select a neighbor that is closest to the sender-destination direction as an alternative next hop. FIG. 6 illustrates such a repair operation.

Thus, according to an embodiment of the invention, the node 100 can transmit packets to a neighbor node located closest to the packet forwarding direction in the corresponding region, excluding those surrounding nodes that are in a state incapable of transmitting a reply message to the route request message.

Continuing with the description, if the sender could not find other nodes in that direction, i.e. in a directional area failure case, the sender may turn on the directional failure (DF) flag in this direction and then propagate a directional-failure warning (DFW) message to its one-hop neighbors with this information.

Figure 7:
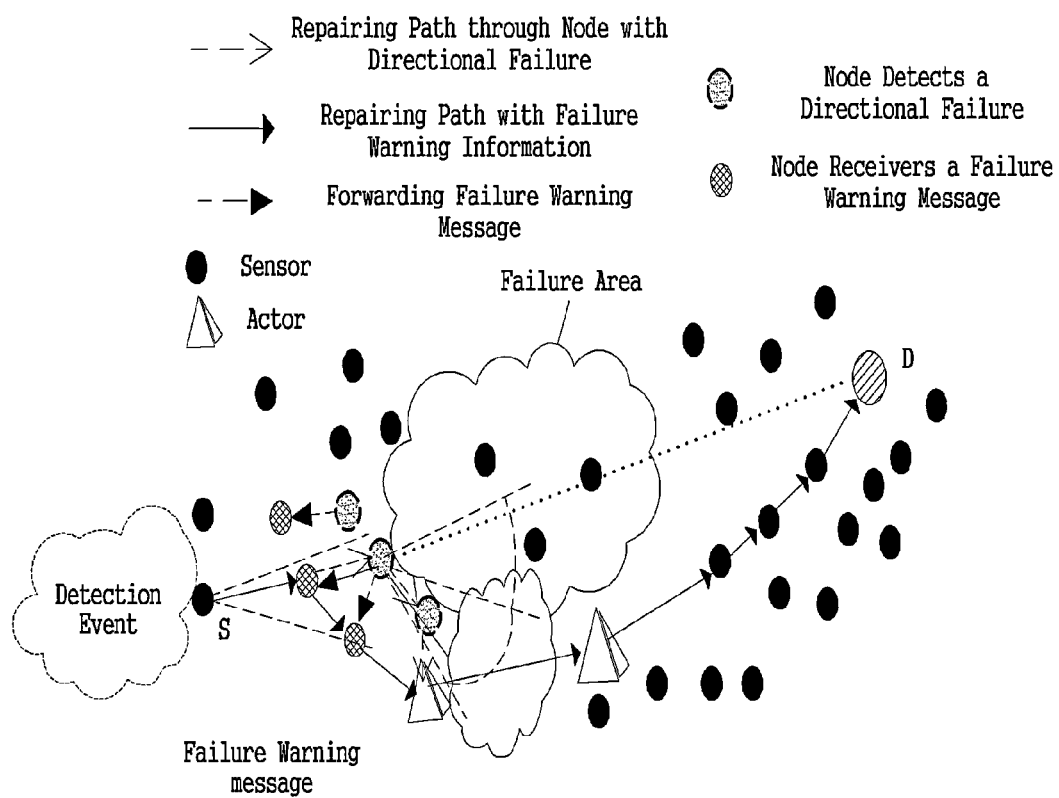
FIG. 7 is a diagram schematically illustrating a directional failure repair case according to an embodiment of the invention.

A DFW message may inform the sender's neighbors that packets to a destination in the same direction should not be relayed to this sender, and may trigger the path repair operation as shown in FIG. 7.

If a packet is transmitted in a direction which marked a failure warning, the forwarding direction should change in order to avoid the failure area.

If the angle α of the direction from the sender to the destination is less than or equal to 45°, the forwarding direction may be changed by the right-hand rule. In particular, the packet may be forwarded by discovering the neighboring beams of this node in the right hand, since this direction is closer to the destination and provides a shorter path.

The forwarding operation in the neighboring beam may also follow the above rules of the ADA method to exploit the benefit of using actors.

In this way, the long-transmission-range capability of an actor can be exploited to overcome a failure area.

If the angle α is greater than 45°, the forwarding direction may change by the left hand rule. The packet may be forwarded by discovering the neighboring beam of this node in the left hand. The detailed operation of the left hand rule may be similar the right hand rule.

That is, if there is no neighbor node present in the region traversed by the packet forwarding direction, the node 100 can transmit directional failure messages to the multiple number of nodes located in regions other than the region traversed by the packet forwarding direction. When a node receives such a directional failure message from another node, the node can transmit packets using the (k+1)-th beam pattern or the (k−1)-th beam pattern adjacent to the k-th beam pattern, instead of using the k-th beam pattern previously used for packet forwarding.

The operation above may be processed continuously until the packet passes the failure area and follows ADA's rules to reach to the destination.

If exploring the neighboring beams also fails to repair the path, the node may be isolated. One alternative solution may be to increase its radio range and make use of a directional antenna in long-range transmission to overcome the failure.

The failure node and area can be refreshed by sending probe messages periodically from neighbor nodes to the failure area. If the probe message is answered successfully, the sending node may detect a recovery of the failed node.

A failure-recovered message may be sent to one-hop neighbors, and the corresponding failure information may then be deleted from the sending node and its neighbors.

FIG. 8A, FIG. 8B, FIG. 8C, and FIG. 8D are diagrams illustrating the nearest actor sub-optimal selection problem, which may occur in an embodiment of the invention.

In the static directional antennas grouping, the source node may select only the actor in the corresponding region of the forwarding direction for relaying packets. This may result in a sub-optimal nearest-actor problem as shown in FIGS. 8A to 8D.

Figure 8A:
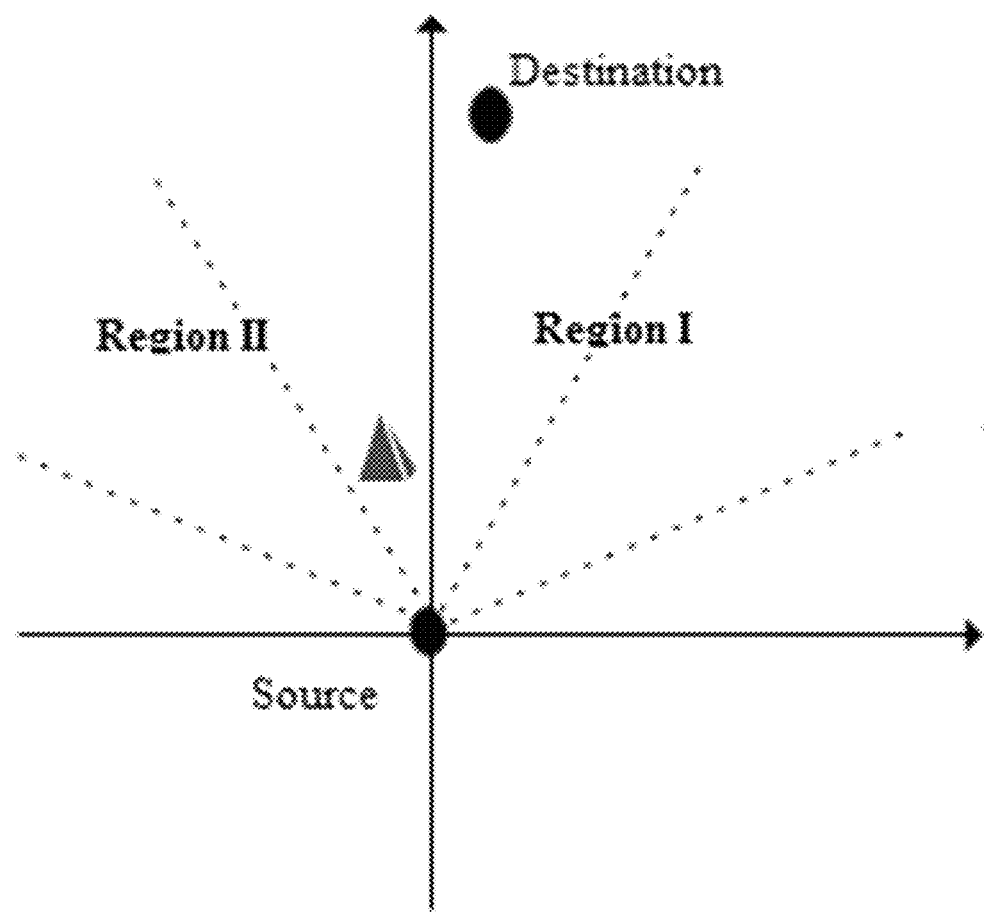
FIG. 8A, FIG. 8B, FIG. 8C, and FIG. 8D are diagrams illustrating the nearest actor sub-optimal selection problem, which may occur in an embodiment of the invention.

In FIG. 8A, each static region includes 3 fixed beams. There is no actor in the current region of forwarding direction while there is an actor at a neighboring beam but different region.

Therefore, packets may be forwarded through multi-hop relaying sensors to a sink node, and the capability of rich-resource actor in neighboring beam of region II may not be exploited.

Figure 8B:
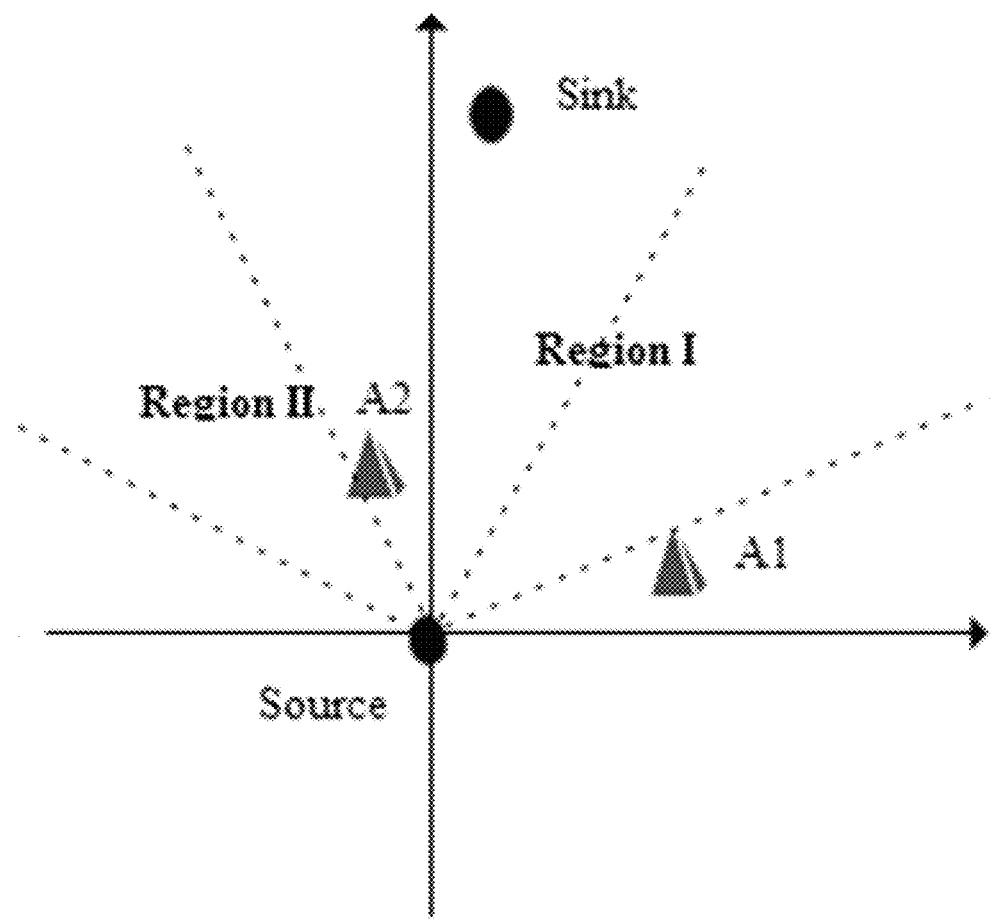

In FIG. 8B, there is the nearest actor A1 in current region I of the forwarding direction, but A1 is farther than the actor A2, which is located in a neighboring beam but different region.

The nearest actor sub-optimal selection problem can be solved in an ADA routing method according to an embodiment of the invention by applying dynamic grouping.

In dynamic grouping based on an embodiment of the invention, each beam may discover a nearest-actor, however, a region may be grouped on-demand for each packet.

To be more specific, when a node has packets to send, first it may determine the direction of the destination. Next, the corresponding beam of this direction may be obtained.

Here, the current beam and two neighboring beams including one left beam and one right beam may be grouped to be a region.

The node 100 may select the closest actor among the three nearest-actors corresponding to the three-beams to be the optimal nearest-actor in this region.

The closest actor may be selected to reduce the forwarding distance of sensors, and thus save the energy of sensors.

The remaining actors can be used as back-up actors of this region if a failure happens in the current nearest-actor.

Figure 8C:
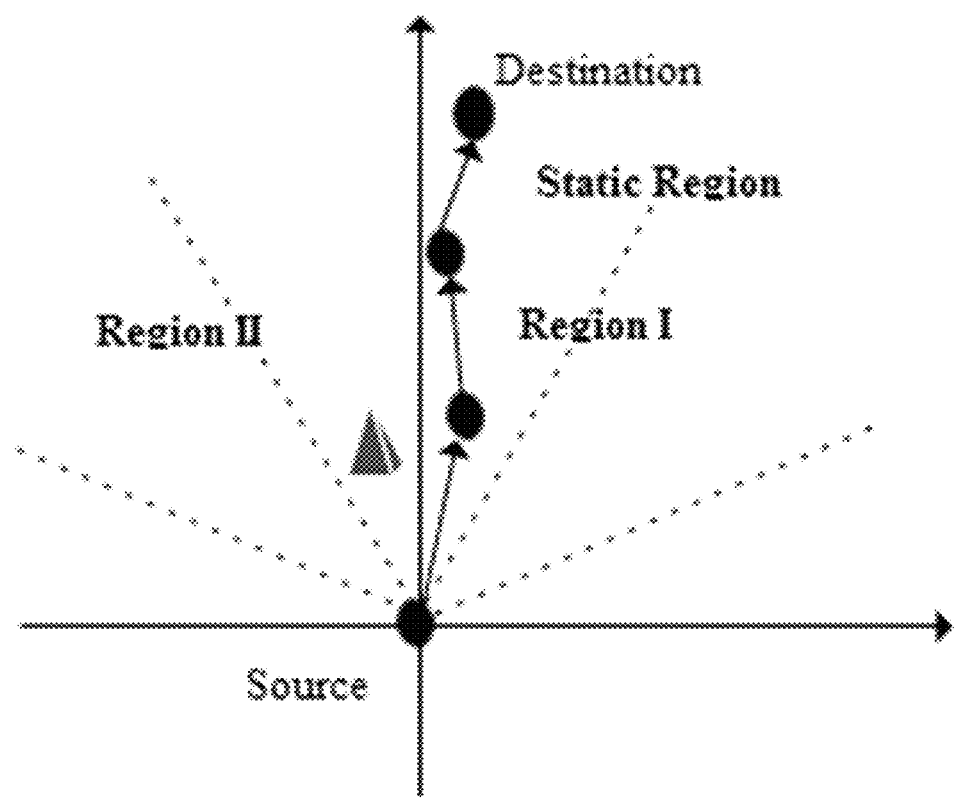
Figure 8D:
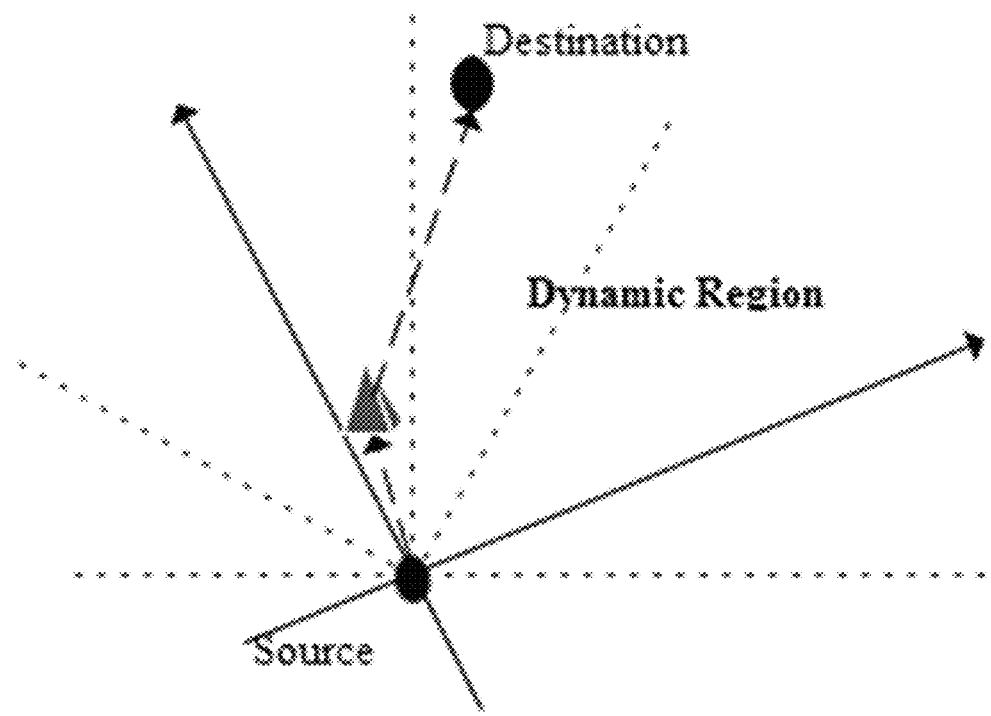

The packet may then be forwarded to the destination through the nearest-actor of the dynamic region as in the example shown in FIG. 8D.

In FIG. 8C, the packet may be relayed through intermediate sensors because of using static regions, and the actor in the neighboring beam but different region may not be exploited.

On the other hand, in FIG. 8D, the actor in the neighboring beam can be exploited to forward the packet by the dynamic region. This can help reduce the number of sensors in forwarding the packet, thus saving energy for the sensors.

Thus, in determining the region traversed by the packet forwarding direction, a node 100 according to an embodiment of the invention can determine a dynamic region that includes the n-th beam pattern, which corresponds to the packet forwarding direction, as well as the (n+1)-th beam pattern and the (n−1)-th beam pattern adjacent to the n-th beam pattern, from among the multiple beam patterns of the node 100, to be the region traversed by the packet forwarding direction.

Figure 9:
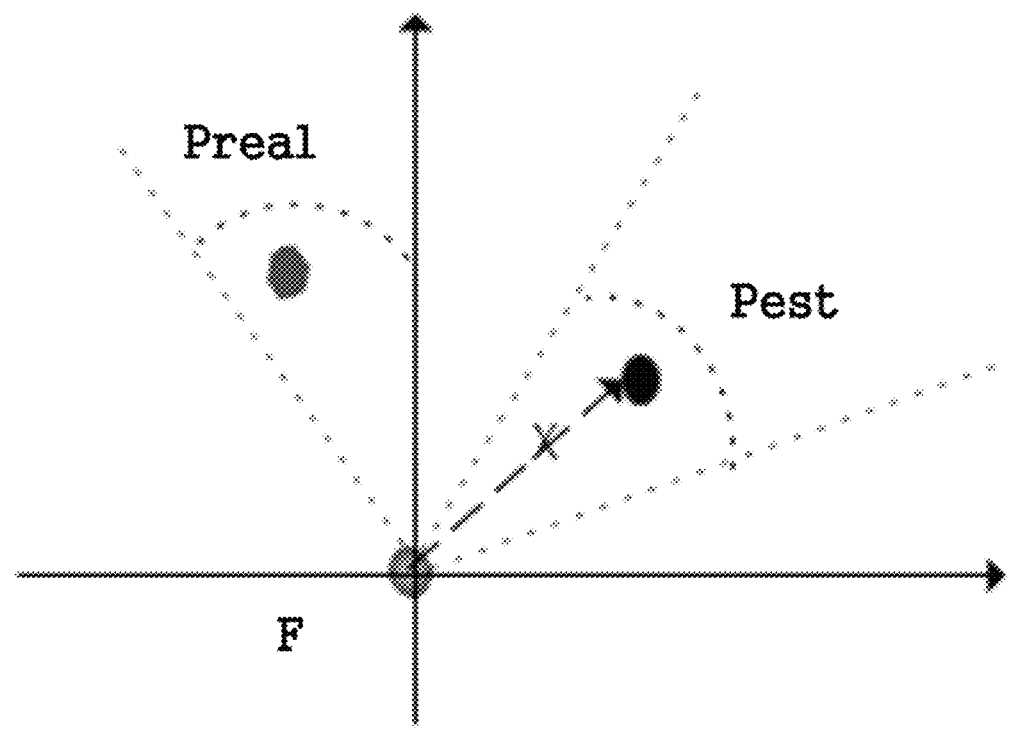
FIG. 9 is a diagram illustrating the destination location error problem, which may occur in an embodiment of the invention.

FIG. 9 is a diagram illustrating the destination location error problem, which may occur in an embodiment of the invention.

As described above, in an actor-oriented directional anycast (ADA) routing method according to an embodiment of the invention, packets may be routed based on the destination address using the relative position as routing information, not fully based on exact location as geographic routing.

However, the location information of destination can have a certain degree of inaccuracy in real deployment because the calculation at the route discovery phase may be affected by other conditions. This may lead to an inefficient forwarding. Therefore, the destination location error should be studied to reduce the failure of forwarding.

One benefit of using actors as important anchors for entity-to-entity routing is that the larger coverage of actors may repair a part of the error naturally if the estimated location and the real location of destination are located in the corresponding directional coverage of actors.

In this case, the packet can be forwarded successfully even when the destination location error occurs. However, this special case is not always achieved.

Referring to FIG. 9, the destination location error may lead to an imprecise forwarding direction calculation. Here, F is the last hop towards the destination D based on the calculated location at route discovery phase, $P_{est}$ is the calculated location of the destination, and $P_{real}$ is the real location of the destination.

By incorporating topology-based with direction-based routing, ADA can repair the case of destination location error based on the knowledge of location error deviation.

In the route discovery phase of ADA, the destination location can be calculated by forwarding the route discovery message to the destination, so in the static case of the destination, the destination location error deviation can be kept within a percentage of the transmission range.

Moreover, from previous studies, it can be seen that the maximum location error bounds up to 100% of transmission range.

Based on this knowledge, a relaying node in ADA may check its distance to the destination.

If the distance from this node to the destination is smaller or equal to twice the transmission range of this node, the topology-knowledge may be used firstly instead of the calculated destination location to avoid the failure by the destination location error.

This is because the real location of destination D may be in any place within a transmission range from node F.

If the destination information exists in the neighboring table of this node, the packet may then be forwarded directionally to the destination based on the neighboring information instead of the calculated destination location piggybacked in the packet.

The corresponding beam used to forward the packet based on neighboring information and based on the calculated destination information can be different due to location error.

The neighboring information may be updated periodically, so this can be more precise and reliable than the calculated destination location from the source node.

If not, the packet may be forwarded based on the calculated destination as above.

Therefore, the packet may be routed based on the direction calculated from the relative location of the destination, and the last hop forwarding may be based on neighboring information, to guarantee packet delivery even in case of location error.

If the impreciseness is too large by using the above mechanism, the last hop can execute an expanded ring searching to a larger number of hops.

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A node for transmitting a packet using a directional antenna, the node comprising:
   a determining unit configured to determine whether or not there is an actor node present in a region traversed by a packet forwarding direction, wherein the packet forwarding direction is determined from relative-location information of a destination node with respect to a source node, the region is one of a plurality of regions divided by particular angles, and the plurality of regions have multiple beam patterns of the node formed therein; and
   a forwarding unit configured to transmit the packet to an actor node present in the region traversed by the packet forwarding direction or transmit the packet to a neighbor node present in the region traversed by the packet forwarding direction, wherein
   the neighbor node is a first node located in a region traversed by the packet forwarding direction from among multiple nodes each configured to receive a location information request message transmitted from the node to each of the plurality of regions, calculate its relative position with respect to the node, and transmit a reply message including the calculated relative-location information to the node, and
   the neighbor node is a second node located closest to the packet forwarding direction from among the multiple nodes other than the first node, if the first node is in a state incapable of transmitting the reply message.

2. The node according to claim 1, wherein the forwarding unit transmits the packet to the actor node if it is determined that there is an actor node present, and transmits the packet to the neighbor node if it is determined that there is no actor node present.

3. The node according to claim 1, wherein the actor node is an actor node nearest to the node in the region traversed by the packet forwarding direction from among one or more actor nodes each configured to receive a location information request message transmitted from the node to each of the plurality of regions, calculate its relative position with respect to the node, and transmit a reply message including the calculated relative-location information to the node.

4. The node according to claim 3, wherein a distance from the node to the nearest actor node is shorter than a distance from the node to the destination node.

5. The node according to claim 1, wherein the first node is a node located closest to the packet forwarding direction from among the multiple nodes.

6. The node according to claim 1, wherein the forwarding unit transmits a directional failure message to multiple nodes located in regions other than the region traversed by the packet forwarding direction from among the plurality of regions, if there is no neighbor node present in the region traversed by the packet forwarding direction.

7. The node according to claim 1, wherein the forwarding unit transmits the packet using a k-th beam pattern from among the plurality of beam patterns of the node formed in the region traversed by the packet forwarding direction, and if a directional failure message including information regarding a packet forwarding failure region is received from the neighbor node, the forwarding unit transmits the packet using a (k+1)-th beam pattern adjacent to the k-th beam pattern.

8. The node according to claim 1, wherein the region traversed by the packet forwarding direction is a region in which are formed an n-th beam pattern (wherein n is an integer greater than or equal to 2) and an (n+1)-th beam pattern and an (n−1)-th beam pattern adjacent to the n-th beam pattern from among the multiple beam patterns of the node.

9. The node according to claim 1, wherein the packet forwarding direction is a vector connecting the source node with the destination node determined from the relative-location information of the destination node with respect to the source node.

10. A method of transmitting a packet from a node using a directional antenna, the method comprising:
    determining whether or not there is an actor node present in a region traversed by a packet forwarding direction, wherein the packet forwarding direction is determined from relative-location information of a destination node with respect to a source node, the region is one of a plurality of regions divided by particular angles, and the plurality of regions have multiple beam patterns of the node formed therein; and
    transmitting the packet to an actor node present in the region traversed by the packet forwarding direction or to a neighbor node present in the region traversed by the packet forwarding direction, wherein
    the neighbor node is a first node located in a region traversed by the packet forwarding direction from among multiple nodes each configured to receive a location information request message transmitted from the node to each of the plurality of regions, calculate its relative position with respect to the node, and transmit a reply message including the calculated relative-location information to the node, and the neighbor node is a second node located closest to the packet forwarding direction from among the multiple nodes other than the first node, if the first node is in a state incapable of transmitting the reply message.

11. The method of claim 10, wherein the actor node is an actor node nearest to the node in the region traversed by the packet forwarding direction from among one or more actor nodes configured to receive a location information request message transmitted from the node to each of the plurality of regions, calculate its relative position with respect to the node, and transmit a reply message including the calculated relative-location information to the node.

12. The method of claim 10, wherein the transmitting comprises transmitting a directional failure message to multiple nodes located in regions other than the region traversed by the packet forwarding direction from among the plurality of regions, if there is no neighbor node present in the region traversed by the packet forwarding direction.

13. The method of claim 10, wherein the transmitting comprises transmitting the packet using a k-th beam pattern from among the plurality of beam patterns of the node formed in the region traversed by the packet forwarding direction, and if a directional failure message including information regarding a packet forwarding failure region is received from the neighbor node, transmitting the packet using a (k+1)-th beam pattern adjacent to the k-th beam pattern.

14. The method of claim 10, wherein the region traversed by the packet forwarding direction is a region in which are formed an n-th beam pattern (wherein n is an integer greater than or equal to 2) and an (n+1)-th beam pattern and an (n−1)-th beam pattern near to the n-th beam pattern from among the multiple beam patterns of the node.

\* \* \* \* \*